Sept. 24, 1968                M. A. KNIGHT                3,403,317
                       BATTERY CHARGING CONTROLLER
                          Filed Jan. 27, 1966
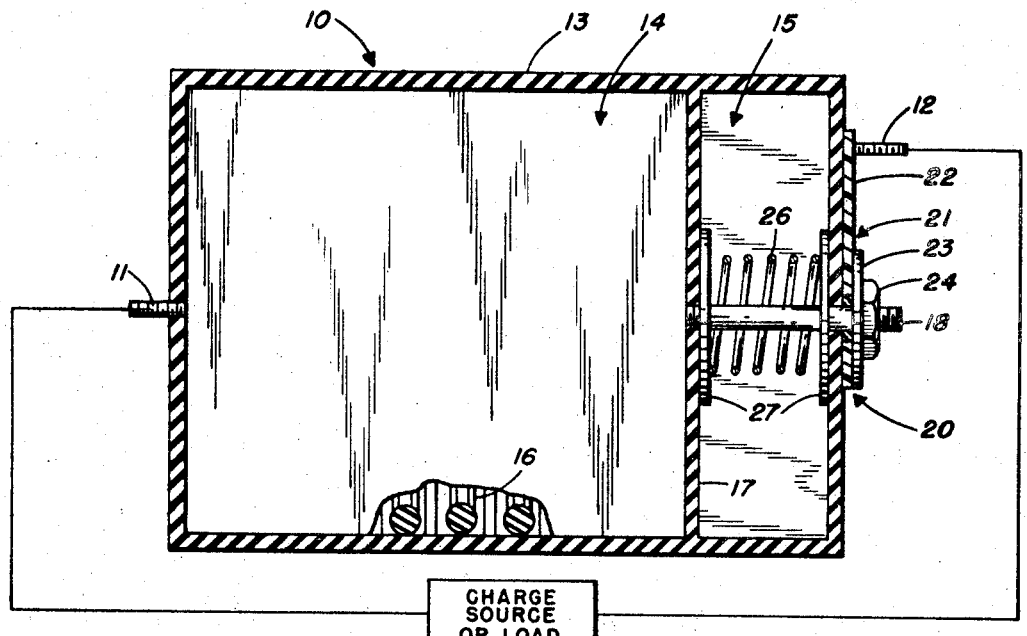
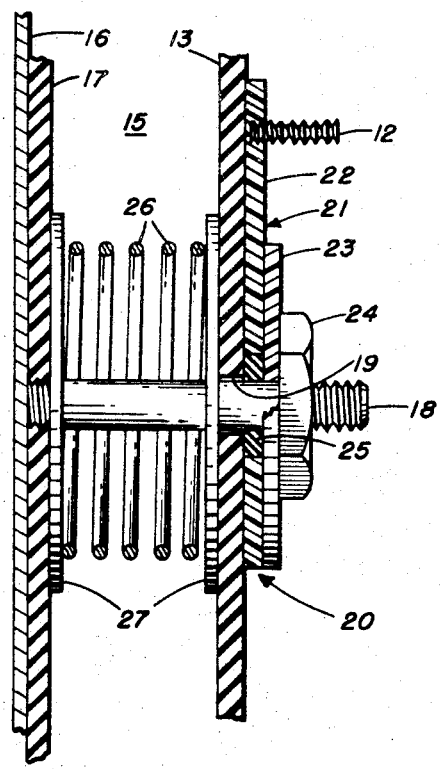
INVENTOR
MILTON A. KNIGHT
BY *Claude Funkhouser*
ATTORNEY

United States Patent Office 3,403,317
Patented Sept. 24, 1968

3,403,317
BATTERY CHARGING CONTROLLER
Milton A. Knight, Box 113, R.R. 1,
Centreville, Va. 22020
Filed Jan. 27, 1966, Ser. No. 523,467
2 Claims. (Cl. 320—22)

ABSTRACT OF THE DISCLOSURE

A battery charging control which gradually varies the impressed charging voltage through the operation of a carbon pile resistance element which varies the effective magnitude of the charging voltage in response to changes in internal battery cell pressure.

---

The invention described herein may be manufactured and used by or for the Government of the United States of America for governmental purposes without the payment of any royalties thereon or therefor.

This invention relates generally to batteries, and more particularly to batteries having a battery charge controller responsive to internal battery conditions.

One of the most critical problems which has traditionally confronted those who use and maintain secondary batteries is that of battery damage due to overcharging. Excessive charging, with its resultant structural fatigue and potentially harmful internal gas generation, is the cause of more premature battery failures than any other deleterious condition which is experienced in normal battery operation. Various approaches have been taken in attempting to cope with this problem. For example, many known battery charging systems are made responsive to changes in battery voltage in such a manner that charging current is inversely related to battery voltage. However, since the voltage difference between a fully charged and a discharged battery is very small, voltage responsive charging regulators must be extremely sensitive and therefore difficult to maintain. Other battery charging control systems sense characteristics such as electrolyte temperature and gas generation rate to actuate circuit interrupting switches or to control the output of the charging generator. For the most part, these systems are complex, difficult of adjustment and maintenance, and not satisfactorily responsive to the actual degree of charge of a battery to preclude damage from overcharging. Further, such control devices are usually sophisticated structures which must be integrated with the charging systems, external to both charging generators and the battery under charge. None of the known systems embodies a battery charging controller which combines simplicity and economy with reliability over the entire spectrum of secondary battery applications.

In studies directed to overcoming these difficulties, it was noted that the internal cell pressure of a battery during charging may broadly be said to be a function of the magnitude of charging current, state of charge and internal temperature. For example, as a battery approaches the fully charged state, decreasing amounts of charging current are used for actual charging and the remainder causes electrochemical gas generation until ultimately, at full charge, all charging current is causing internal gas generation. Likewise, charging current can be impressed upon a battery at such a rate that excessive gas generation will be caused. Obviously, if the cell section of a battery is hermetically sealed, any gas generation will be reflected by a change in internal cell pressure. It would appear, therefore, that these pressure changes can be used as a reliable indicator for both rate and degree of charge.

An object of the present invention, therefore, is the provision of a battery charging controller which is responsive to changes in the internal cell pressure of the battery being charged.

Another object is to provide a battery charging controller which is capable of being used with all types of secondary batteries.

A further object of the invention is the provision of a battery charging controller which eliminates the requirement for complex, expensive and difficult to maintain charging controllers of the type now generally in use.

Still another object is to provide a battery charging controller which may be made integral with the battery structure and be operated directly by changes in internal battery conditions.

A still further object of the present invention is to provide a battery charging controller which is fully adaptable to extreme thermal conditions without resort to time consuming and complex adjustments.

Yet another object of the present invention is the provision of a battery charging controller which is simple in structure, reliable in operation and inexpensive to manufacture and operate.

According to the present invention, the foregoing and other objects are attained by providing a variable impedance in the circuit of a battery charging system, the value of which is directly controlled by internal cell pressure of the battery, whereby the charging voltage impressed on the battery is automatically varied in accordance with both rate and state of charge.

The simplicity and other advantages of the invention will hereinafter become more fully apparent from the following description of the annexed drawings, which illustrate a preferred embodiment and wherein:

FIG. 1 shows a plan view, partly in section, of a preferred embodiment of the invention; and FIG. 2 is an exploded view of the variable resistance structure of the battery of FIG. 1.

Referring now to the drawings, wherein like reference characters designate like parts throughout, there is shown in FIG. 1 a secondary battery 10 having cathodic terminal 11, anodic terminal 12 suitable for connection across a charge source or a load and a charging controller generally indicated by reference numeral 20 according to the present invention. The battery is formed of a casing 13 comprising two sections, a cell chamber 14 and a void chamber 15. Electrically connected, electrochemical cell elements 16 are mounted in the cell chamber 14. The type of electrochemical cell is not critical for the purposes of this invention therefore any secondary cell structure adaptable for use in a sealed battery may be provided including the cell structure disclosed in copending application for "Battery With Multi-layer Electrodes," Serial No. 570,143, filed August 2, 1966. Separating the cell chamber 14 from the void chamber 15 is a flexible wall 17 which will deflect, in the manner of a diaphragm, in response to changes in internal cell pressure.

A shaft 18 formed of an electrically conductive material is perpendicularly mounted in flexible separator wall 17 and electrically connected to the cell chamber 14 so as to become an integral part of the battery circuit. Flexure of separator wall 17 causes displacement of the shaft 18 which passes freely through an aperture 19 formed in the end wall of battery casing 13. A coil spring 26, disposed around the shaft 18 and between separator wall 17 and the inner surface of the outer wall of battery casing 13, bears on load washers 27 and provides a compensating resistance to retard any over-flexure of the separator wall which may result from excessive pressures generated within the cell chamber.

Further, spring 26 maintains a load force on a carbon pile resistor 21 when internal cell pressure of the battery is below a predetermined value.

As can be more readily seen in FIG. 2, the carbon pile resistor 21 having an inner disc 22 and an outer disc 23 is mounted on shaft 18 and secured by a retaining nut 24 threadedly engaging shaft 18. Inner carbon disc 22 is electrically insulated from shaft 18 by an insulating washer 25 whereby the flow of current from the cell section is through shaft 18 to outer carbon disc 23, thence to inner carbon disc 22 and therethrough to anodic terminal 12 which is mounted on disc 22. The casing 13 of the instant embodiment is made entirely of a nonconductive material. However, the casing can be encased in a metal jacket or the like and accordingly in insulating material would be mounted between inner carbon disc 22 and the electrically conductive metal jacket.

As is well known, the resistance of a carbon pile resistor is inversely proportional to the pressure at the interface between adjacent carbon discs. It is readily seen, therefore, that if pressure within cell chamber 14 increases during charging, separator wall 17 will flex outwardly thus displacing shaft 18 outwardly through the battery casing 13. Such displacement of the stud will decrease interface pressure between carbon discs 22 and 23. Accordingly, the resistance of the pile will increase thus increasing the resistance of the battery charging path thereby decreasing the charging voltage applied across the electrochemical cells. As the cell chamber pressure decreases by reason of a drop in internal temperature or charging rate, the action of coil spring 26 will tend to displace separator wall 17 to its original position thus increasing the interface pressure between discs 22 and 23 thereby increasing the charging voltage impressed on the electrochemical cells. As is readily apparent, the degree of flexure of separator wall 17 is very slight and is governed by the amount of displacement necessary to vary the resistance of the carbon pile from maximum to minimum values. Ordinarily, this amounts to a displacement of from two to four thousandths of an inch.

Initial interface loading on the carbon pile and subsequent adjustments as desired can be made by adjusting the retaining nut 24 on the shaft 18. Adjustment of the nut 24 may also be used as a means for varying the overall sensitivity of the controller 20, for example, when charging is to be accomplished under extreme thermal conditions.

It is readily seen, therefore, that the battery charging controller of the present invention is a simple, inexpensive, and reliable device which is adaptable for use with any secondary battery. The integration of controller with battery structure and the simplicity of a direct mechanical linkage between the cell section and the variable resistor provide for a substantially maintenance free device at minimum cost.

It should be understood, of course, that the foregoing disclosure relates to only a preferred embodiment of the invention and that numerous modifications or alterations may be made therein without departing from the spirit and the scope of the invention as set forth in the appended claims.

What is claimed is:
1. In combination:
a secondary battery comprising a sealed cell chamber for receiving electrochemical cells and a void chamber in a casing;
a flexible wall separating said sealed cell chamber from said void chamber;
resilient means for biasing said flexible wall;
sensing means comprising a shaft mounted on said flexible wall, said shaft extending from said flexible wall through said void chamber and slidably through an aperture in said casing;
a carbon pile resistor securedly mounted on said shaft adjacent said aperture and external to said casing;
a first terminal mounted on said casing and in electrical connection with said cell chamber;
a second terminal electrically connected to said carbon pile resistor, said first and second terminals being connectable to a load or a charging source; and
whereby flexure of said flexible wall due to variations in the internal pressure of said cell chamber causes displacement of said shaft and variation of the interface pressure of said carbon pile resistor, thus altering the effective electrical resistance of the battery.

2. A rechargeable battery having a sealed case;
a flexible partition dividing the case into a compartment for electrochemical cells and a void compartment;
resilient means for biasing the flexible partition;
rigid means having one end fastened to the flexible partition and the other end slidably extending outside the case;
a carbon pile resistance attached to the end of the rigid means which is outside of the case;
a first terminal connected to the electrochemical cells for receiving potential from a charging source; and
a second terminal connected to the carbon pile resistance for also receiving potential from the charging source;
whereby flexure of the flexible partition due to the internal pressure of the cells varies the interface pressure of the carbon pile resistance to vary the effective charging potential from the charging source.

References Cited

UNITED STATES PATENTS

| | | | |
|---|---|---|---|
| 1,087,289 | 2/1914 | Halbleib | 320—46 X |
| 1,876,985 | 9/1932 | Lippard | 320—44 X |
| 2,621,317 | 12/1952 | Ihrig | 320—46 X |
| 3,252,071 | 5/1966 | Plessis | 320—46 |
| 3,281,640 | 10/1966 | Mas | 320—46 |
| 3,328,663 | 6/1967 | Kagan | 320—46 X |

FOREIGN PATENTS 737,008  9/1955  Great Britain.

LEE T. HIX, *Primary Examiner.*
S. WEINBERG, *Assistant Examiner.*